US010126638B2

United States Patent
Yeh

(10) Patent No.: US 10,126,638 B2
(45) Date of Patent: Nov. 13, 2018

(54) PROJECTOR WITH PROTECTION AGAINST OVERHEATING

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Chin-Wen Yeh, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 42 days.

(21) Appl. No.: 15/636,915

(22) Filed: Jun. 29, 2017

(65) Prior Publication Data

US 2018/0292738 A1 Oct. 11, 2018

(30) Foreign Application Priority Data

Apr. 10, 2017 (CN) .......................... 2017 1 0229719

(51) Int. Cl.
G03B 21/16 (2006.01)
H04N 9/31 (2006.01)

(52) U.S. Cl.
CPC ........... *G03B 21/16* (2013.01); *H04N 9/3144* (2013.01)

(58) Field of Classification Search
CPC ...................................................... G03B 21/16
See application file for complete search history.

(56) References Cited

U.S. PATENT DOCUMENTS

2012/0134149 A1* 5/2012 Enomoto ............... G03B 21/16
362/231
2016/0021349 A1* 1/2016 Katou .................. H04N 9/3144
348/748

* cited by examiner

*Primary Examiner* — Toan Ton
*Assistant Examiner* — Danell L Owens
(74) *Attorney, Agent, or Firm* — ScienBiziP, P.C.

(57) ABSTRACT

A projector with inbuilt heat-dispersing properties includes a shell, an illuminating device mounted in the shell, and a cooling module mounted in the shell. The cooling module includes two heat conducting members in close contact with the illuminating device, and a heat insulator in close contact with the bottom end of the shell. Heat generated from the illuminating device is transmitted to the heat conducting member, the heat transmitted to the heat conducting member is transmitted to the bottom end of the shell and the heat is uniformly dispersed on the bottom end of the shell. The heat transmitted to the shell is uniformly transmitted to the heat insulator to be discharged from the projector.

16 Claims, 4 Drawing Sheets

PROJECTOR WITH PROTECTION AGAINST OVERHEATING

CROSS-REFERENCE TO RELATED APPLICATIONS

This application claims priority to Chinese Patent Application No. 201710229719.6 filed on Apr. 10, 2017 the contents of which are incorporated by reference herein.

FIELD

The subject matter herein generally relates to projectors.

BACKGROUND

The projector is mostly designed as a one-piece structure, and the volume of the projector has become smaller and smaller. The projector needs an illuminating device to provide light, and the illuminating device produces a lot of heat during operation, resulting in the projector close to the illuminating device being subjected to high heat irradiation. Improvements are necessary in the art.

BRIEF DESCRIPTION OF THE DRAWINGS

Implementations of the present disclosure will now be described, by way of example only, with reference to the attached figures.

DETAILED DESCRIPTION

Figure 1:
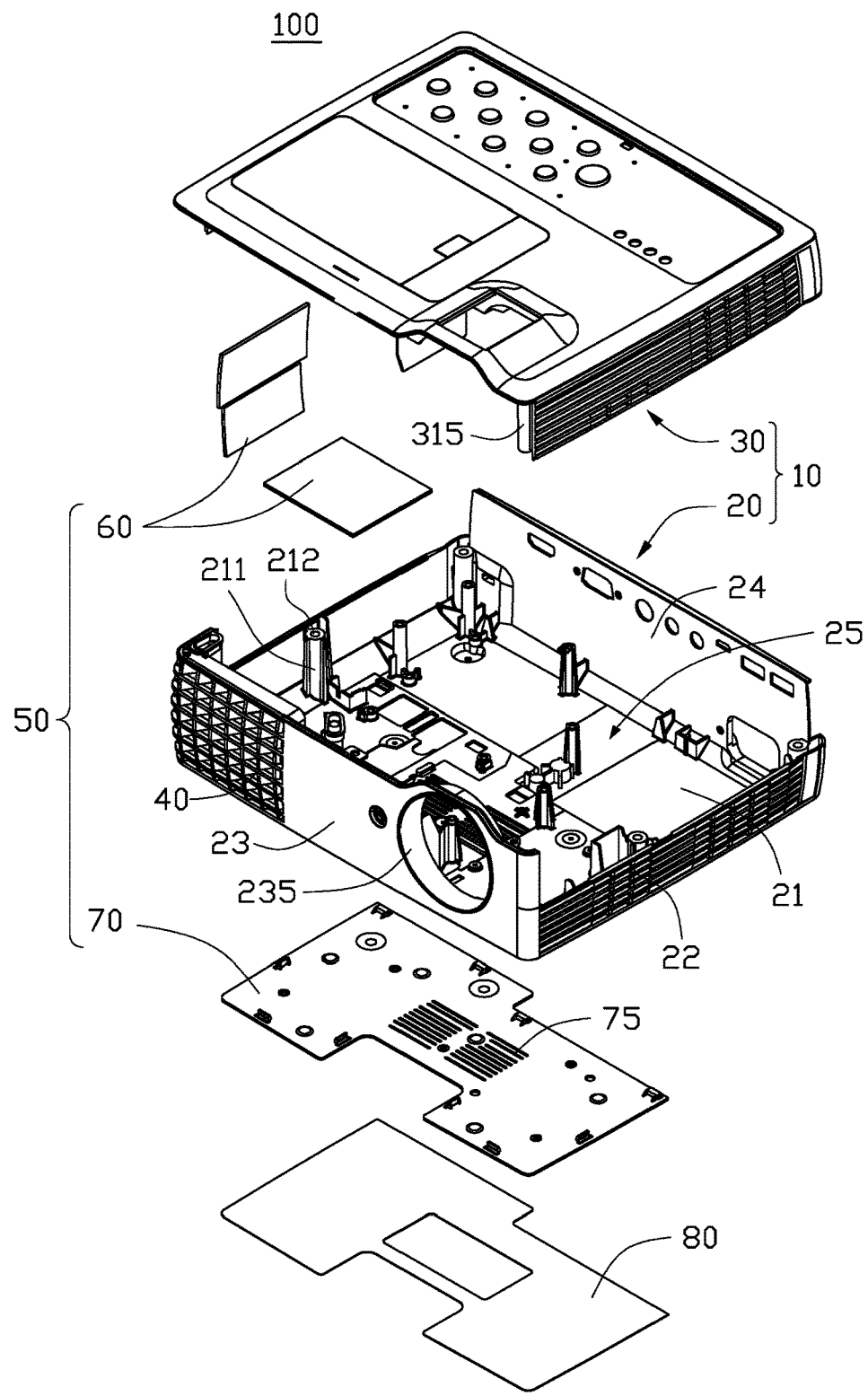
FIG. 1 is an exploded view of one exemplary embodiment of a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates one exemplary embodiment of a projector 100 that includes a shell 10, an illuminating device (not shown) mounted in the shell 10, and a cooling module 50 mounted in the shell 10.

The shell 10 includes a base 20 and a cover 30 connected to the base 20. The base 20 includes a bottom plate 21, two side plates 22 connected to sides of the bottom plate 21, a front plate 23 connected to a front end of the bottom plate 21, and a rear plate 24 connected to a rear end of the bottom plate 21. The bottom plate 21, the side plates 22, the front plate 23, the rear plate 24, and the cover 30 together deform a receiving space 25. The illuminating device and the cooling module 50 are received in the receiving space 25.

The bottom plate 21 includes a plurality of positioning columns 211. A top end of each positioning column 211 defines a positioning hole 212. The cover 30 includes a plurality of guide columns 315, and the guide columns 315 are configured to be inserted into the positioning holes 212 to secure the cover 30 on the base 20. The front plate 13 defines a through hole 235, the light from the illuminating device 20 can pass through the through hole 235. The bottom plate 21, the side plates 22, and the front plate 23 define a plurality of heat emission holes 40. Heat can be discharged from the projector 100 by the heat emission holes 40.

The cooling module 50 covers the bottom plate 21 and one of the side plates 22, and is in close contact with the illuminating device. The cooling module 50 includes a two heat conducting members 60 and a heat insulator 70. The heat conducting members 60 are in close contact with the illuminating device to quickly conduct away the heat generated by the illuminating device. The heat insulator 70 is in close contact with the bottom end of the bottom plate 21. The heat insulator 70 defines a plurality of air holes 75 to quickly conduct the heat. A protecting member 80 is in close contact with the heat insulator 70 to protect the cooling module 50 and the projector 100.

In at least one exemplary embodiment, the heat conducting members 60 may be made of a metallic material, and further, the heat conducting members 60 may be made of aluminum and copper. In at least one exemplary embodiment, the heat insulator 70 may be made of a thermally resistant material, and further, the heat insulator 70 may be made of plastic.

Figure 2:
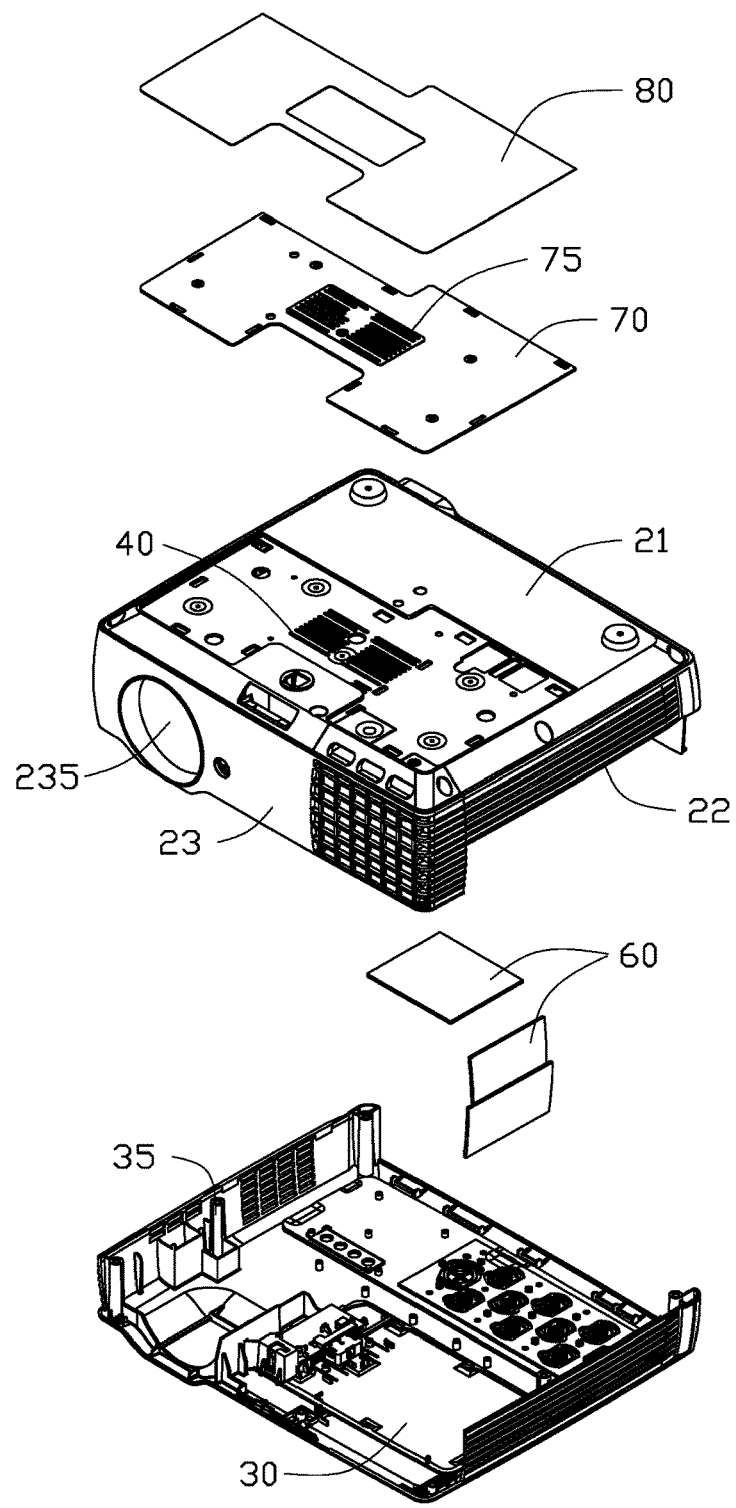
FIG. 2 is similar to FIG. 1 but viewed from a different angle.
Figure 3:
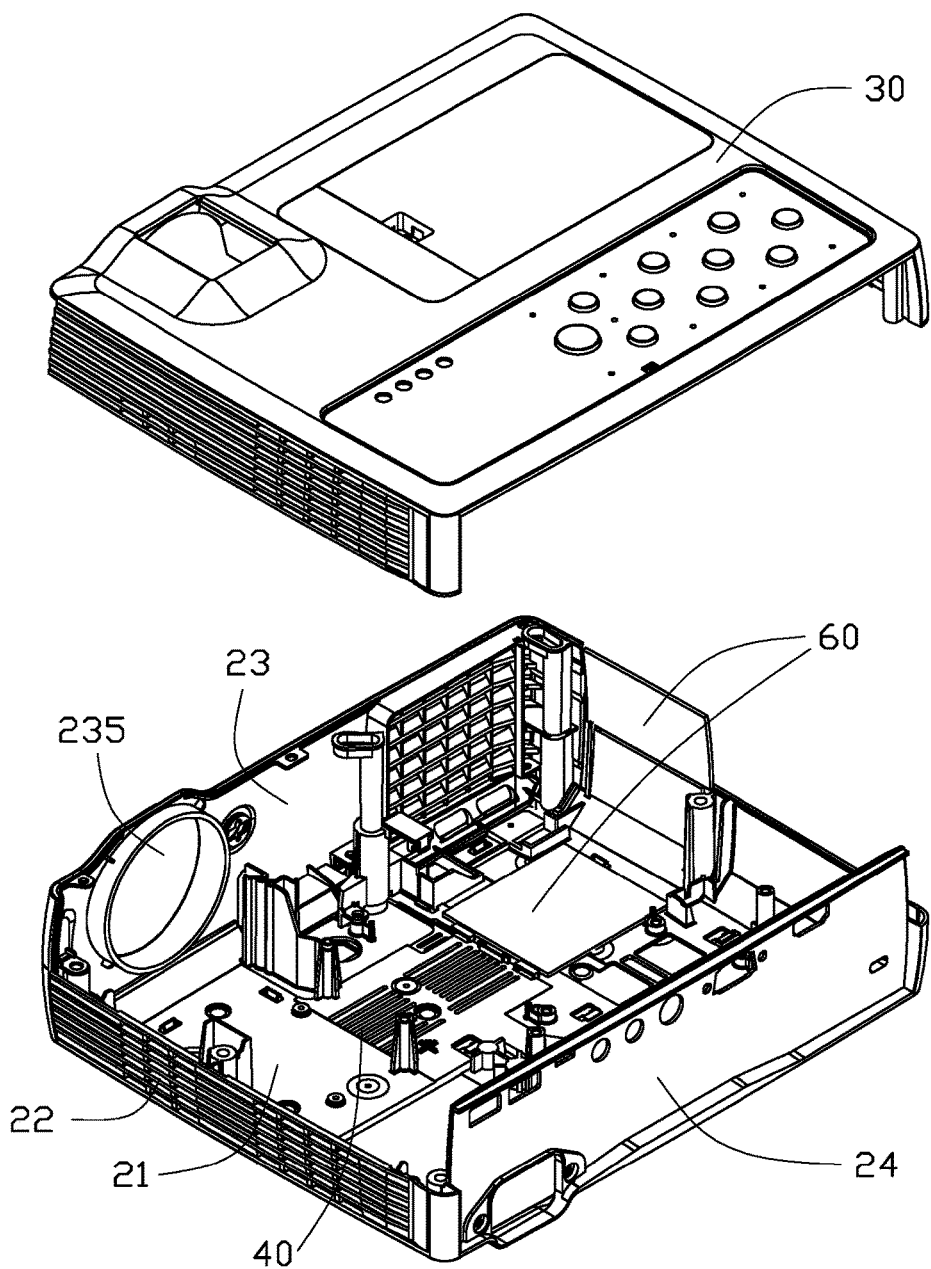
FIG. 3 is a perspective view showing the assembly of the projector of FIG. 1, and a cover is not yet installed on the base.
Figure 4:
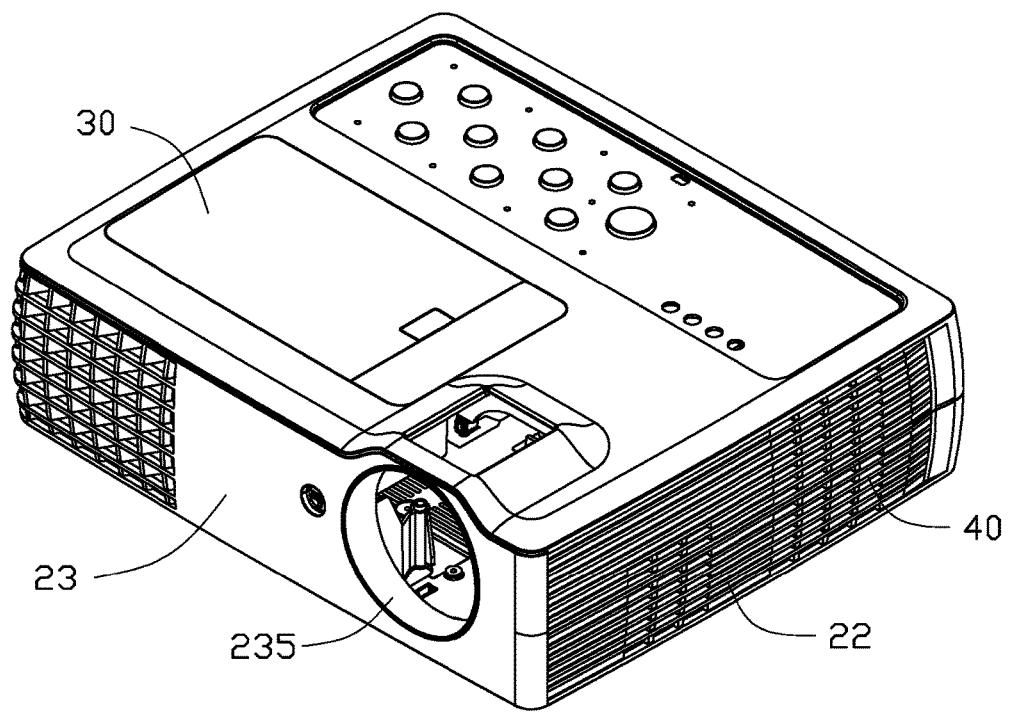
FIG. 4 is similar to FIG. 3 with the cover installed on the base.

FIGS. 1, 3, and 4 illustrate the assembled projector 100. To assemble the projector 100, the conducting members 60 are received in the receiving space 25, and respectively mounted on the bottom plate 21 and one of the side plates 22 close to the illuminating device. The illuminating device is placed in the receiving space 25, and the two heat conducting members 60 are in close contact with the surface of the illuminating device. The heat insulator 70 is in close contact with the bottom end of the bottom plate 21, and the air holes 75 are aligned with the heat emission holes 40 of the bottom plate 21 as shown in FIG. 2. The protecting member 80 is in close contact with the heat insulator 70. The cover 30 is placed above the base 20, and the guide columns 35 are inserted into the positioning holes 212 of the positioning columns 211 to secure the cover 30 onto the base 20. Thus, the projector 100 is assembled.

When using the projector 100, the illuminating device is activated and generates a large amount of heat, which is quickly transmitted to the heat conducting member 60. The heat conducting members 60 absorb heat and transmit the heat to the bottom plate 21. The heat transmitted to the bottom plate 21 is uniformly dispersed onto the bottom plate 21 due to the thermally resistant effect of heat insulator 70. The local temperature of the bottom plate 21 near the illuminating device is significantly reduced.

The exemplary embodiments shown and described above are only examples. Many details are often found in the art such as the other features of a projector. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A projector comprising:
a shell; and
a cooling module mounted in the shell, the cooling module comprising:
two heat conducting members received in the shell; and
a heat insulator in direct contact with an exterior bottom of the shell;
wherein heat generated from the projector is transmitted to the heat conducting member, the heat transmitted to the heat conducting member is transmitted to the exterior bottom of the shell, the heat is uniformly dispersed on the exterior bottom of the shell, and the heat transmitted to the shell is uniformly transmitted to the heat insulator to be discharged from the projector wherein the projector comprises a protecting member, and
the protecting member is in direct contact with the heat insulator, thereby sandwiching the heat insulator between the exterior bottom of the shell and the protecting member.

2. The projector of claim 1, wherein the shell comprises a base, the base comprises a bottom plate, the projector further comprises an illuminating device, and the illuminating device is mounted on the bottom plate.

3. The projector of claim 2, wherein the base further comprises two side plates respectively connected to two sides of the bottom plate, the cooling module is mounted on the bottom plate and one of the side plates close to the illuminating device.

4. The projector of claim 3, wherein the base further comprises a front plate connected to a front end of the bottom plate, the front plate defines a through hole, and light generated from the illuminating device passes through the through hole.

5. The projector of claim 4, wherein the shell further comprise a cover, the cover and the base together form a receiving space, the illuminating device and the cooling module are received in the receiving space.

6. The projector of claim 5, wherein the bottom plate, the side plate, and the front plate define a plurality of heat emission holes, and the heat is discharged from the projector by the heat emission holes.

7. The projector of claim 5, wherein the base comprises a plurality of positioning columns, each positioning column defines a positioning hole, the cover comprises a plurality of guide columns, and the guide columns are respectively inserted into the positioning holes to secure the cover onto the base.

8. The projector of claim 1, wherein the heat conducting members are made of at least one metallic material.

9. The projector of claim 8, wherein the heat insulator is made of at least one thermal resistance material.

10. A projector comprising:
a shell; and
a cooling module mounted in the shell, comprising:
two heat conducting member received in the shell; and
a heat insulator in direct contact with the exterior bottom of the shell; and
a protecting member;
wherein heat generated from the projector is transmitted to the heat conducting member, the heat transmitted to the heat conducting member is transmitted to the exterior bottom of the shell, the heat is uniformly dispersed on the exterior bottom of the shell, and the heat transmitted to the shell is uniformly transmitted to the heat insulator to be discharged from the projector, the protecting member is in direct contact with the heat insulator to protect the cooling module and the projector wherein the shell comprises a base, the base comprises a bottom plate, the projector further comprises an illuminating device, and the illuminating device is mounted on the bottom plate;
wherein the base further comprises two side plates respectively connected to two sides of the bottom plate, the cooling module is mounted on the bottom plate and one of the side plates close to the illuminating device.

11. The projector of claim 10, wherein the base further comprises a front plate connected to a front end of the bottom plate, the front plate defines a through hole, and light generated from the illuminating device passes through the through hole.

12. The projector of claim 11, wherein the shell further comprise a cover, the cover and the base together form a receiving space, the illuminating device and the cooling module are received in the receiving space.

13. The projector of claim 12, wherein the bottom plate, the side plate, and the front plate define a plurality of heat emission holes, and the heat is discharged from the projector by the heat emission holes.

14. The projector of claim 12, wherein the base comprises a plurality of positioning columns, each positioning column defines a positioning hole, the cover comprises a plurality of guide columns, and the guide columns are respectively inserted into the positioning holes to secure the cover onto the base.

15. The projector of claim 10, wherein the heat conducting members are made of at least one metallic material.

16. The projector of claim 15, wherein the heat insulator is made of at least one thermal resistance material.

* * * * *